Oct. 4, 1966  F. C. ROBARDS  3,276,159
TRAPPING DEVICE
Filed Nov. 2, 1964

INVENTOR
FREDERICK C. ROBARDS
BY
ATTORNEYS 3,276,159
TRAPPING DEVICE
Frederick C. Robards, 220 Behrends Ave.,
Juneau, Alaska
Filed Nov. 2, 1964, Ser. No. 408,443
3 Claims. (Cl. 43—15)

The invention herein described and claimed may be manufactured and used by or for the Government of the United States of America for governmental purposes without the payment of royalties thereon or therefor.

This invention relates to improvements in animal traps, and more particularly concerns a snare device that need not rely upon the movements of an animal or bird to cause the function thereof to completion. A constrained, self-propelling mechanism of the device is made effective, when released, to draw closed an open noose appropriately laid out about an area on the ground, a tree limb, or other location in which the bird or animal sought might alight. Providing the driving power to close the noose is a spring steel bow-like structure which is operatively maintained in a highly stressed condition by a latching mechanism adapted to be released in response to a slight pressure thereon from some part of an animal or bird coming within the noose opening. When the spring bow structure is latched, the noose can have an unusually wide opening so as to allow the snare device to cover an advantageously enlarged vulnerable area. Moreover, the extremely rapid expanding action of a released bow structure becomes effective to accomplish a fast closing action of even the widest noose opening with the result that an animal or bird is ensnared before it can react and jump or fly clear of the noose. However, since the amount of force the restrained part of the device is permitted to exert in any particular ensnarement can be predetermined, the present invention has wide utility ranging from capturing birds without damaging them to trapping fur-bearing animals.

A principal object of the present invention is therefore to provide a fast acting snare device of relatively simple construction that can be used for capturing small animals or birds.

Another object of the invention is to provide a sensitive, self-operating snare device easily adapted to have general utility for many different trapping and fishing purposes.

These and other objects of the invention will be more clearly understood from the following description of preferred embodiments of the invention considered together with the accompanying drawing wherein.

Figure 1:
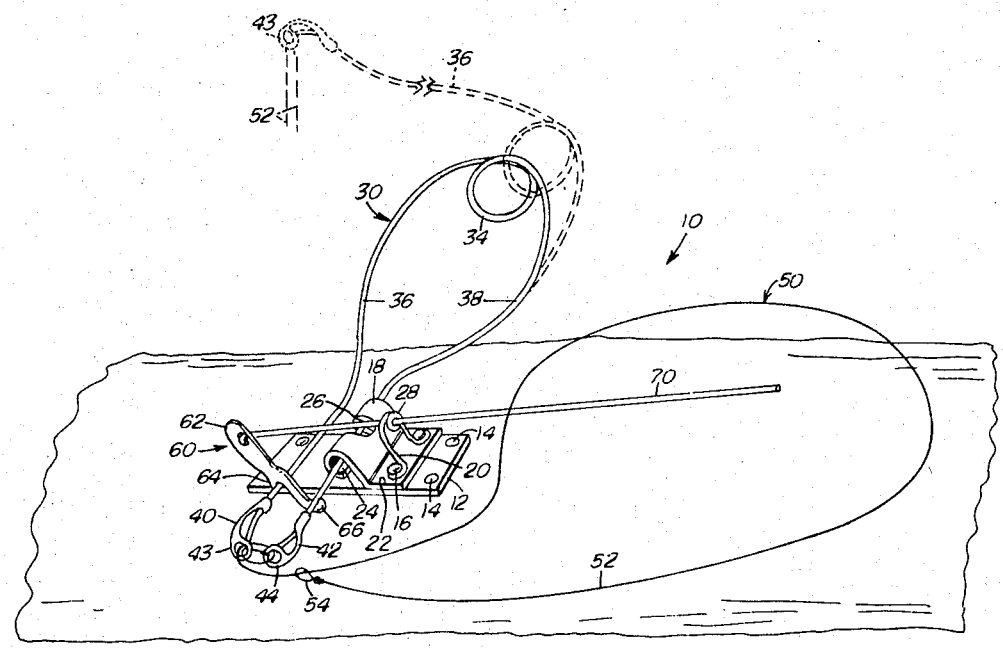
FIG. 1 is a pictorial view of the improved snare device, according to the present invention, shown fully as arranged in an operative set condition, and partly as in a released condition.

Illustrated in FIG. 1 is a snare device 10, according to the invention, set out for operation on a fallen log. A substantially rectangular sheet metal plate 12, constituting a base for the device, is provided with several small holes adjacent its corners in which are retained screws or tacks 14 fastening the device to the log. Plate 12 has two additional openings (not shown), adapted to receive rivet or screw fasteners 16 which, when applied as hereinafter described, hold together a bearing bracket 18 and a pivot support 20, and retain these parts fixed in operative positions on plate 12.

Bracket 18 is a unitary element comprising a flat, rectangular attaching flange 22, provided with appropriately spaced holes to accommodate fasteners 16, and a curved extension, upwardly disposed from the flange, which curls around downwardly to form a partial sleeve 24. A small section cut out of the central portion of the upper surface of sleeve 24 provides a shallow notched opening 26. Pivot support 20 functions in device 10 as a flexible retainer having a slight pivotal action for a purpose to be hereinafter more fully explained. This pivot support, as shown in FIG. 1, can be made by twisting a short length of small diameter rod to form a small open coil or eye 28 between a pair of symmetrically curved extensions whose extremities are further bent so as to terminate in open flat loops. Fasteners 16 are received into these loops and are located therewith over aligned openings provided in flange 22 and plate 12, wherein the fasteners are applicable to securely tie together plate 12, the flange and the support in an obvious manner. As can be seen from the showing in FIG. 1, when pivot support 20 is thusly fixed in device 10, its eye 28 is aligned in front of notch 26 of bracket sleeve 24.

The main activating force for operating device 10 is produced by a bow-like structure made from an extended length of spring steel wire 30. A medial portion of wire 30, which is bent into a loop, forms an open coil 34, and its further portions include a pair of gradually curving extensions 36 and 38, spreading from the ends of coil 34 in a substantially symmetrical arrangement. Spring wire 30 is thus shaped to facilitate the application of moderate pressure thereto for bringing closely together its extensions 36 and 38, such that its coil 34 is heavily stressed so as to be subsequently operable as a strong spring which can instantly act to drive the extensions apart. It should therefore be evident that upon yielding extensions 36 and 38 to the spring action of coil 34, they rapidly separate to return wire 30 to its initial bow-like configuration.

Fixed to the respective tip portions of the extensions 36 and 38 are individual line guiding structures 40 and 42 having rigidly supported ring-like eyelets 43 and 44, respectively. A noose 50 for device 10 is created from a length of monofilament line 52, made of a tough plastic, or other equivalent line material. Line 52 has one end tied about eyelet 44, and passes through opening 43 wherefrom it further passes around eyelets 44 and 43, respectively, to extend beyond the eyelets to form noose 50 through a slide loop 54 at its other end.

A latch mechanism restraining the action of spring coil 34 to spread wire 30 into the bow-like shape, illustrated in part by dash-lines in FIG. 1, includes a trip clamp 60 which slips over and under the extensions 36 and 38, respectively, contacting substantially parallel parts of the extensions close to their tip ends. Clamp 60 comprises a lever arm 62 having formed integral therewith a stublike downwardly projecting hook-like claw 64 and a longer, forwardly extending, curved hook-like claw 66. Claw 64 is adapted to engage extension 36, so as to allow upward rotation of clamp 60 to bring a hook-like part of claw 66 against the under and outside surfaces of extension 38. The spring action urging the extensions to spread, causes them to bear against the rigid clamp claws whereby the latter grip and latch the extensions.

Although partial sleeve 24 normally rests on plate 12, there is sufficient flexibility in this sleeve structure to allow the small diameter wire of extension 38 to slide thereunder and into the sleeve proper. Wire bow 30, with clamp 60 in place to hold its extensions in check, is operatively situated when, as shown in FIG. 1, a short length of extension 38 is loosely fitted through sleeve 24. The release of clamp 60 is accomplished by an elongated trip rod 70, constituting a further part of the latch mechanism. Rod 70 is maintained in operative position by a slip fit thereof in eye 28 of pivot support 20, which locates the rod whereby it extends back to lie in notch 26 of bracket 18, and hook into a small opening at the end of clamp lever arm 62. However, the greater part of rod 70 extends forward from eye 28 to pass under noose line 52 for suitable exposure within the area enclosed by noose 50. Any bird or animal coming into the area within the noose is vulnerable to capture since it requires only a slight jar of rod 70 to bring the snare into action. A small displacement of the forward end of rod 70 acts to flex support 20, wherein the rod pivots sufficiently to cause the opposite end thereof to dislodge clamp 60. Short claw 64 is thus slipped away from bow extension 36, permitting spring coil 34 to instantly draw extensions 36 and 38 apart, and widely separate their eyelets 43 and 44. Since one end of noose 50 is tied to eyelet 44, line 52 is stretched taut between the eyelets and noose 50 is pulled completely closed about the bird or animal part within it.

Figure 2:
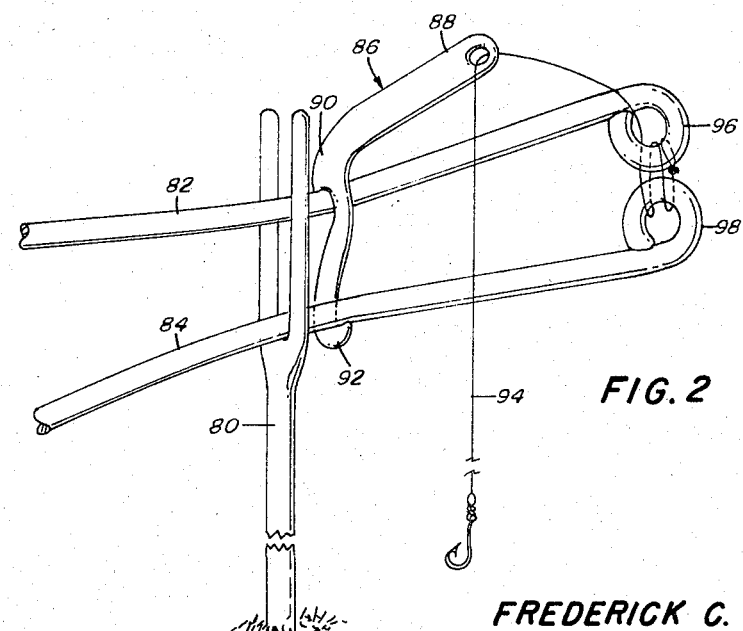
FIG. 2 is a similar showing of principal operating parts of a further embodiment of the invention.

FIG. 2 illustrates an application of the principle of the invention to an automatic fishing rig which would have important utility under emergency conditions. As will hereinafter become apparent this rig is also readily ap- hereinafter for use in ice fishing. A forked support 80, anchored upright in the ground, can be used to appropriately locate the rig at the fishing site, although it could just as easily be fastened to an overhanging branch. The drawn-up extensions 82 and 84 of a spring bow rests in the hollow of fork 80 such that a trip clamp 86 presents its lever arm 88 over the water at the site. Claws or hooks 90 and 92 of the clamp grip and hold the extensions under spring tension, as hereinbefore explained in connection with FIG. 1, and a suitable hole near the end of lever 88 receives therethrough a fishing line 94. Turned-in ends of the respective extensions 82 and 84, form simplified eyelets 96 and 98, through which line 94 is laced after one end thereof is tied about eyelet 96.

Weight and baited hook are secured to the loose end of line 94 in the usual manner, and lowered into the water. A fish tugging on the line disengages clamp 86, and the ensuing operation of the spring bow, as heretofore described, would pull in the slack on the line. As the fish tired, slack fishing line would continue being drawn up until the bow was fully spread.

The snare according to the invention is easily adapted to many different styles of trapping or fishing. It can be used as a tethering snare without damage to the bird or animal. Obviously, it can also be made lethal by using more powerful spring structures. Release of the spring bow clamp may also be accomplished by means of a simple baited trip line extending from the clamp's lever arm to lie within the noose spread across a trail. The size and effectiveness of the noose can be predetermined as required by the size and form of the animal or bird to be captured by selecting a proper bow size and weight, and line length, or number of turns of line between eyelets. Stops fixed to the line can also be used to predetermine the size of opening to which the noose will close so as to accommodate an animal without choking it. Flexible metal lines and cables can be used in place of plastic line as required by the objective of the trapper. Therefore, while preferred embodiments of the invention have been illustrated and described, it is understood that the invention is not limited thereby, but is susceptible to change in form and detail.

What is claimed is:

1. A trapping device comprising a spring means having elongated extensions, a line operatively engaged by said extensions and having a free end adapted to hold the trapped quarry, a trip mechanism including a latch means having oppositely opening hook portions operatively positioned on said extensions for restraining the spring means from displacing its extensions, and means operatively associated with the free end of said line to displace said latch means from restraining position.

2. A trapping device comprising a base plate, a spring means having elongated extensions adapted to be driven by the spring action thereof, a line tied to and operatively engaged by said extensions and having a free end constituting a noose, a trip mechanism including a latch means having oppositely opening hook portions operatively positioned on said extensions for restraining the spring means from driving its extensions, and a trip means having a part located within said noose and another part operatively connected to displace said latch means from restraining position, flexible means fixed to said base plate and pivotally supporting said trip means, and a bracket fixed to said base and engaged with said spring means to hold it on said base plate.

3. A trapping device comprising a base, a spring bow having elongated curved portions extending from a part urging said portions to straighten, a line having one end thereof constituting a noose, means on the extremities of said extended curved portions engaging another end of said line and operable to guide the disposition of said line, a trip mechanism including a latch means having oppositely opening hook portions operatively positioned on said extended portions of said spring bow for restraining the action of said urging part thereof from displacing said extended portions toward a straightened condition, and a trip means having a part thereof within said noose and a further part thereof operatively connected to displace said latch means from restraining position, means fixed to said base and pivotally supporting said trip means, and further means fixed to said base and engaged with one of said extended portions of said spring bow to hold it on said base.

References Cited by the Examiner

UNITED STATES PATENTS

| | | | |
|---|---|---|---|
| 999,214 | 8/1911 | Filipowski | 43—16 |
| 1,422,424 | 7/1922 | Dunn | 43—87 |
| 2,200,617 | 5/1940 | Clover | 43—87 |
| 2,898,696 | 8/1959 | Bolland | 43—15 |

SAMUEL KOREN, *Primary Examiner.*

W. H. CAMP, *Assistant Examiner.*